United States Patent
Judas et al.

(10) Patent No.: US 10,173,267 B2
(45) Date of Patent: Jan. 8, 2019

(54) TOOL CLAMPING DEVICE

(71) Applicant: ESA Eppinger GmbH, Denkendorf (DE)

(72) Inventors: Joel Judas, Unterensingen (DE); Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 0 days.

(21) Appl. No.: 14/976,026

(22) Filed: Dec. 21, 2015

(65) Prior Publication Data

US 2016/0175943 A1 Jun. 23, 2016

(30) Foreign Application Priority Data

Dec. 23, 2014 (DE) ............ 10 2014 119 482

(51) Int. Cl.
*B23B 29/24* (2006.01)
*B23B 29/20* (2006.01)

(52) U.S. Cl.
CPC .......... *B23B 29/248* (2013.01); *B23B 29/205* (2013.01); *Y10T 29/5165* (2015.01); *Y10T 82/2508* (2015.01); *Y10T 82/2589* (2015.01)

(58) Field of Classification Search
CPC ............. Y10T 82/2508; Y10T 82/2585; Y10T 82/2587; Y10T 82/2589; Y10T 29/5152; Y10T 29/5154; Y10T 29/5155; Y10T 29/5165; B23B 29/24; B23B 29/242; B23B 29/285; B23B 29/244; B23B 29/246; B23B 29/248; B23B 29/34
See application file for complete search history.

(56) References Cited

U.S. PATENT DOCUMENTS

| | | | |
|---|---|---|---|
| 4,012,818 A * | 3/1977 | Dornbluth | B23Q 1/0063 409/64 |
| 5,167,405 A | 12/1992 | Cayley, Jr. | |
| 5,875,696 A * | 3/1999 | Grossmann | B23B 29/20 29/40 |
| 6,161,826 A | 12/2000 | Fritz | |
| 6,174,114 B1 | 1/2001 | Emil | |
| 7,581,472 B2 * | 9/2009 | Miyairi | B23B 29/20 82/121 |
| 2003/0029287 A1* | 2/2003 | Judas | B23B 29/20 82/158 |
| 2004/0256780 A1 | 12/2004 | Lang | |
| 2011/0023276 A1* | 2/2011 | Jansen | B23B 29/205 29/40 |

(Continued)

FOREIGN PATENT DOCUMENTS

CH 496512 A 9/1970
DE 19705684 A1 8/1998
(Continued)

OTHER PUBLICATIONS

German Office Action in corresponding German Application No. 10 2014 119 482.9 dated Nov. 17, 2015, with Machine English Translation (7 pages).

*Primary Examiner* — Nicole N Ramos
(74) *Attorney, Agent, or Firm* — Fitch, Even, Tabin & Flannery LLP

(57) ABSTRACT

A tool clamping device having a tool holder holding a tool, said tool holder being designed for insertion into a socket of a tool carrier, in particular a lathe, has a tool quick-change system.

45 Claims, 8 Drawing Sheets

(56) References Cited

U.S. PATENT DOCUMENTS

2011/0094355 A1* 4/2011 Sheehy ................ B23B 29/205
                                                82/159
2014/0196583 A1* 7/2014 Judas .................... B23B 29/205
                                                82/121

FOREIGN PATENT DOCUMENTS

| DE | 19917005 C1 | 10/2000 |
| DE | 19940330 C2 | 6/2001 |
| DE | 10155077 A1 | 5/2003 |
| DE | 102008048206 A1 | 4/2010 |
| EP | 0371351 A2 | 6/1990 |
| EP | 0858861 A1 | 8/1998 |
| EP | 0922529 A1 | 6/1999 |

* cited by examiner

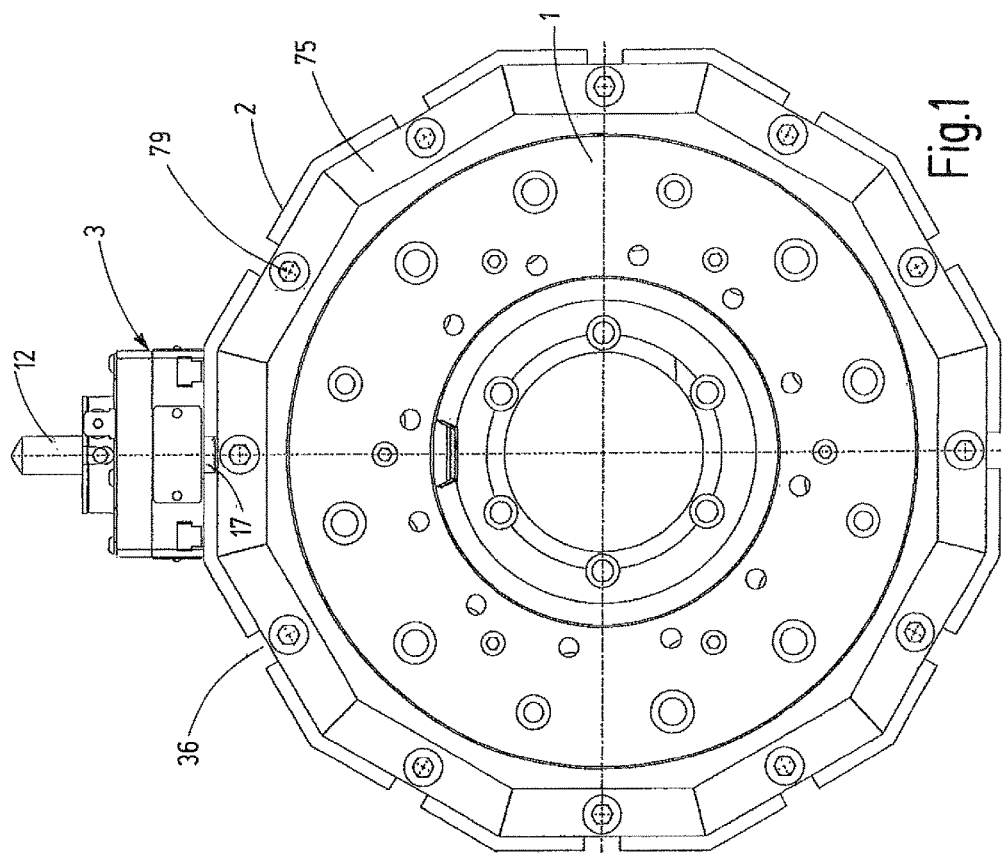
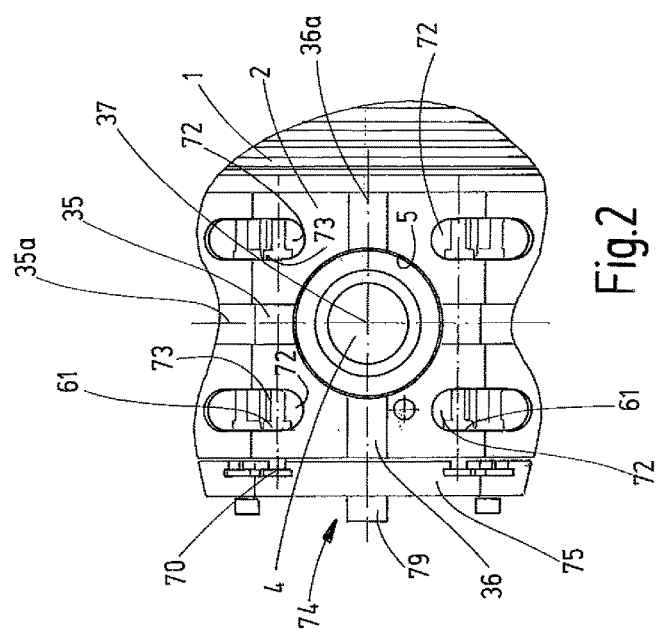

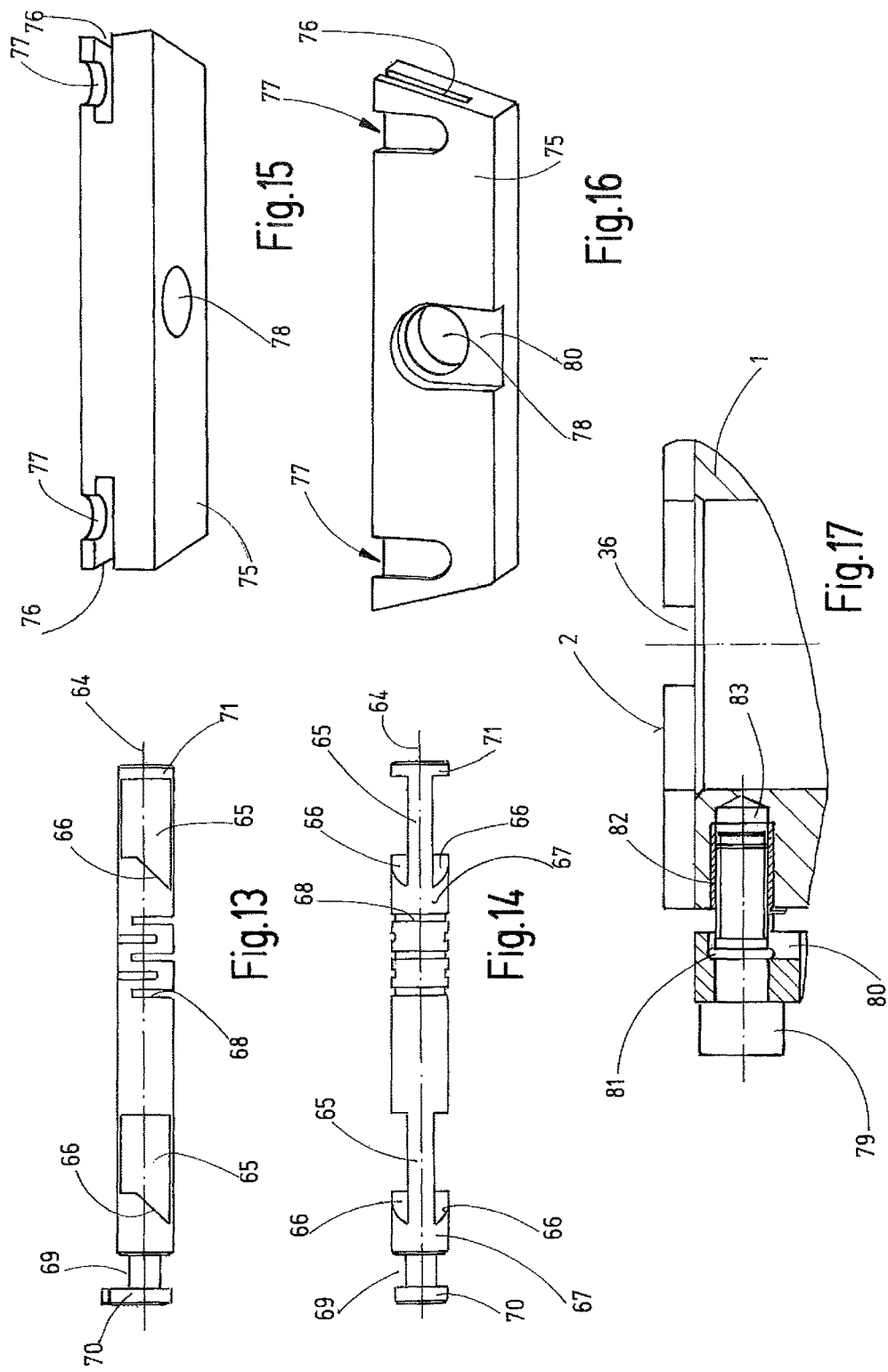

TOOL CLAMPING DEVICE

RELATED APPLICATION(S)

This application claims the benefit of German Patent Application No. 10 2014 119 482.9 filed Dec. 23, 2014, the contents of which are incorporated herein by reference as if fully rewritten herein.

TECHNICAL FIELD

The invention relates to a tool clamping device having a tool holder, which holds a tool and is to be inserted into a socket of a tool carrier, in particular of a lathe, in which the tool holder and the tool carrier have support faces associated with each other and devices for fastening the tool holder to the tool carrier and adjustment means for accurately positioning the tool holder with respect to the socket.

BACKGROUND

A tool clamping device having these features is described in DE 199 40 330 C2. In this tool clamping device the tool holder has at least two adjustment elements, which are arranged at a distance from one another and protrude axially beyond the support face of the tool holder, whereas at least two bearing points associated with the adjustment elements are formed on the tool carrier and are arranged on the wall of at least one receiving groove formed on the tool carrier, the adjustment elements bearing at said bearing points when the tool holder is inserted into the socket. The adjustment elements in one embodiment are T-nuts, which are guided without clearance on the tool holder and are under the influence of spring means, which, when the tool holder is inserted into the socket, press with a predetermined bias against the wall of the respective receiving groove. The adjustment elements can be adjusted exactly in the sense of the accurately dimensioned adjustment of the tool holder with respect to the axis of the socket of the tool carrier, such that the tool holder can be positioned with high accuracy with respect to the tool carrier when said tool holder is inserted into the socket of the tool carrier. The adjustment elements of the tool carrier are generally pre-set by means of a template corresponding exactly to the support face and the receiving groove of the tool carrier. Following this pre-setting, they can be inserted into a socket of the tool carrier with high repeat accuracy, for example when a tool is changed.

The tool holder, which for example is pre-set in this way, is fastened to the tool carrier by means of four threaded bolts, which are arranged around the axis of the tool holder, distributed in corresponding through-bores in a flange-like part, and are screwed to the tool carrier with the tool holder fitted with its support face against the support face of the tool carrier. The threaded bolts are received in the bores of the flange-like part of the tool holder with radial clearance, such that, when tightening the threaded bolts, no transverse forces are exerted onto the tool holder, which forces could impair the pre-setting of the adjustment elements.

Tool clamping devices of this type have proven to be excellent in practice and have become widespread, in particular in CNC turning centres with movable tool carriers, for example in the form of turret plates. The tool clamping device makes it possible to achieve a very high level of positional accuracy of the tool holder on the tool carrier, more specifically both in terms of the angular accuracy, i.e. the rotary position with respect to the axis, and in terms of the positional accuracy, i.e. of the axial offset between the socket of the tool carrier and the inserted tool holder.

In some applications the user increasingly desires a reduction in the tooling time necessary to change a tool. The need for a quicker tool change is given here from the increasingly smaller batch sizes, which force the user to make modifications more frequently in order to thus ensure that the machines are working to a profitable capacity. What are known as quick-change systems exist generally in the field of workpiece clamping and make it possible for workpieces, which for example are fixed on pallets, to be fitted in a defined position on a carrier body arranged on a machine bench and securely clamped to said carrier body by means of a clamping apparatus that can be actuated easily and quickly, generally from an actuation point. A unit for detachably connecting parts of a palletising system is thus described in EP 0 922 529 A1, which unit operates with a pressure-medium-actuated, centrally arranged bolt, which engages with an associated central bore in the part to be clamped and exerts an axial clamping force onto said part during the clamping operation, under the influence of which force this part is engaged with conical centring faces on another part. Such clamping devices, which operate with a central clamping bolt, are therefore not suitable for fastening tool holders for example on a turret plate, because the tool holders often have a standardised cylindrical shaft, with which they are inserted into a receiving bore arranged centrally on the turret plate relative to the support face. The same is also true fundamentally for clamping devices that are similar in principle, which are provided with a centrally arranged draw-in nipple, which transmits the axial clamping force, for a pallet or clamping plate for mounting workpieces, as is described for example in DE 197 05 684 A1 and EP 0 858 861 and DE 199 17 9005 C1.

In a quick-change apparatus known from U.S. Pat. No. 5,167,405 A for workpieces clamped on a workpiece carrier, the workpiece to be machined is clamped on a workpiece carrier upper part by means of clamping jaws. The workpiece carrier upper part formed as a rectangular plate is fixedly screwed in the vicinity of its corners to four cylindrical tension bolts, which protrude through comparatively large openings into a box-shaped workpiece carrier lower part and are supported in the clamping state on the bottom of said lower part. A clamping apparatus accommodated in the workpiece carrier lower part has a rotatably mounted shaft, which is provided with an actuation handle and which carries an eccentric, via which, when the shaft rotates, four clamping bolts are simultaneously brought into engagement with the four tension bolts of the workpiece carrier upper part. In order to align the workpiece carrier upper part with the workpiece carrier lower part, two guide pins arranged spaced apart from one another on the workpiece carrier upper part are provided and are received in corresponding bores in a cover plate of the workpiece carrier lower part. The positioning accuracy of the workpiece carrier upper part attainable with such a quick-change apparatus is limited to the workpiece carrier lower part. There is no precise adjustment of the mutual position of the two parts, and this also is not possible. Much higher demands are placed on the positioning accuracy by a clamping device having repeat accuracy, in particular for clamping workpieces for machining, as is disclosed in DE 101 55 077 A1. This clamping device operates with a reference plane plate, which has at least two clamping openings having walls, on each of which at least one reference face is formed. The reference plane plate is associated with a clamping plate, which has at least two clamping and positioning bolts, which are associated with the clamping openings. A tightening device is provided in order to act on the clamping and positioning bolts with an axial force and a superimposed radial force in order to press a base area of the clamping plate against a clamping face of the reference plane plate by means of the axial force and in order to push the clamping and positioning bolts with positioning faces against the reference faces by means of the radial force. This clamping device does not have any means for adjusting the position of the clamping plate relative to the reference plane plate. The attainable accuracy is dependent on the positional accuracy of the clamping openings.

SUMMARY

Proceeding from this prior art, the object of the invention is to create a tool clamping device of the type mentioned in the introduction which is designed with a tool holder quick-change system which is suitable for the confined spatial conditions in particular of a turret plate and the problematic conditions in the working area of a machine tool or a CNC turning centre, etc., for example when machining.

A tool holder of the new tool clamping device has at least one adjustment element protruding beyond the support face of the tool holder or carrier, whereas at least one bearing point associated with the adjustment element is formed on the tool carrier or holder and is arranged on the wall of at least one receiving groove or opening formed on the tool carrier or holder. The adjustment element bears at this bearing point when the tool holder is inserted in the socket. The at least one adjustment element allows the tool carrier to be positioned with respect to the tool carrier, for example a turret plate, in a positionally accurate manner with repeat accuracy.

Here, the individual adjustment elements may be formed such that they enable a very precise fine adjustment both with respect to the angular accuracy and the axial offset of the tool carrier. In order to remove the joint clearance of the tool holder in the socket of the tool carrier, which tool holder is preliminarily inserted in the above manner and accurately adjusted, and in order to ensure an exact bearing of the adjustment elements against the wall of the receiving groove, the adjustment elements in a preferred embodiment are resilient or are mounted on the tool holder. They are set such that they bear under bias at the respective bearing point on the wall of the receiving groove in the inserted state. The magnitude of this bias is limited in that the tool holder can be inserted into the socket of the tool carrier and can be fastened to the tool carrier without great exertion of force and without the aid of special devices, for example jacking bolts or the like, and in that it is possible in particular, when changing a tool, to remove the tool holder again from the tool carrier correspondingly easily when the fastening devices are released. However, exemplary embodiments are also conceivable in which it is sufficient for the at least one adjustment element to be resiliently deformable or even rigid and to be arranged on the tool holder or carrier in an accurately positioned manner.

The devices for fastening the tool holder to the tool carrier have at least two anchoring rods arranged in a manner extending at right angles to the support face of the tool holder and which are arranged on the tool holder or carrier at a distance from one another and separately from the at least one adjustment element. In addition, a clamping apparatus is provided on the tool carrier or the tool holder and, when the tool holder is inserted into the socket of the tool carrier, engages with the anchoring rods during a clamping operation and exerts an axial clamping force onto said anchoring rods. Here, the arrangement is such that the tool holder during the clamping operation is held free from transverse forces influencing the bearing of the at least one adjustment element of said tool holder at the bearing point thereof on the wall of the at least one receiving groove. Lastly, the clamping apparatus has actuation means, by means of which the clamping apparatus can be driven to act on the at least two anchoring rods jointly in the sense of the pressing against one another of the two support faces of the tool holder and of the tool carrier by means of the generated axial clamping force.

Due to the at least one adjustment element provided on the tool holder or the tool carrier and the at least one receiving groove on the tool carrier or holder, which groove is associated with said adjustment element, an accurate positional fixing of the tool holder with respect to the tool carrier during clamping, i.e. fastening of the tool holder on the tool carrier, is ensured and is independent of the clamping operation and the fastening devices of the tool holder on the tool carrier. Since the tool holder during the clamping operation is held free from transverse forces, which influence the bearing of the at least one adjustment element at the bearing point thereof during the clamping operation, a bias, which is adjusted where appropriate and with which the respective adjustment element bears against the wall of the receiving groove, is also maintained, such that the accurate adjustment, given by the adjustment element, of the position of the tool holder with respect to the tool carrier is not impaired by the clamping operation. The tool holder is fastened to the tool carrier via the anchoring rods, which are independent of adjustment elements and which press the support face of the tool holder against the support face of the tool carrier with such a clamping force that the relatively high transverse forces occurring during the machining of a workpiece by tools inserted into the tool holder are transferred by frictional fit from the tool holder into the tool carrier, without subjecting the adjustment elements of the tool holder or of the tool carrier to any transverse forces, not even as the workpiece is being machined.

Since the clamping apparatus provided on the tool carrier or holder during a clamping operation drives at least two anchoring rods jointly, a quicker and easier tool holder change is possible. If the devices for fastening the tool holder have more than two anchoring rods, for example four anchoring rods, as is generally the case in practice, all of these anchoring rods can also be driven jointly.

In an expedient embodiment the anchoring rods are arranged so as to be movable transversely in a limited manner on the tool holder or the tool carrier, which has the advantage that in cases in which the anchoring rods during the clamping operation and under the influence of the clamping apparatus perform a slight transverse movement transversely to the direction of the clamping force, no transverse forces acting on the tool holder to be clamped are thus to be produced, but instead only the axial clamping force is exerted onto the tool holder.

The clamping device can be formed differently per se in order to produce the necessary axial clamping force at each of the anchoring rods when the tool holder is inserted into the socket of the tool carrier. In an expedient embodiment the clamping apparatus may have clamping elements guided movably in the tool carrier or holder, which clamping elements each can be displaced between an active position engaged with a clamping part of the associated anchoring rod in the clamping direction and a rest position releasing the associated anchoring rod. These clamping elements may be formed for example as tension rods, which are guided displaceably in the tool carrier or holder and carry at least one engagement part cooperating with the clamping part of the respective associated anchoring rod. The engagement part may have at least one wedge face, whereas the anchoring rod associated with this engagement part is provided on its clamping part with at least one complementary wedge face, wherein, when the tension rods are in the active position, the wedge faces of the engagement part and of the anchoring rod associated with one another are engaged with one another. The cooperating wedge faces form a wedge transmission, via which strong forces can be transferred without great effort and with low spatial requirement and act on the respective anchoring rod. The actuation means for the clamping apparatus may be mechanically coupled with elements of the clamping apparatus, however embodiments in which this coupling is implemented via a pressure medium, for example in a hydraulic or pneumatic way, are also conceivable. It is expedient when the actuation means are accessible from an outer side of the tool carrier and/or holder, for example a turret plate, wherein the actuation means itself may be actuated mechanically or via pressure medium.

The aforementioned tool holders serve to receive turning tools, drilling tools, milling tools and the like, however this is not considered to be limiting. The tool holder may also be formed as a workpiece holder or may be replaced by same.

Further embodiments and developments of the new tool clamping device are disclosed by dependent claims. Exemplary embodiments of the subject matter of the invention are illustrated in the drawing, in which:

BRIEF DESCRIPTION OF THE DRAWINGS

FIG. 1 shows a turret plate as an example of a tool carrier of a tool clamping device according to the invention, in a schematic illustration and in a side view, FIG. 2 shows a detail of the turret plate according to FIG. 1, in a plan view of a support face for a tool holder, in a different scale, FIG. 13 shows a tension rod of the arrangement according to FIG. 11 in a side view and on a different scale, FIG. 14 shows the tension rod according to FIG. 13 in a side view rotated through 90° from below, FIG. 15 shows a tensioning bar of the clamping apparatus of the turret plate according to FIG. 1 in a perspective plan view and on a different scale, FIG. 16 shows the tensioning bar according to FIG. 15 in a perspective view from the rear side, FIG. 17 shows the arrangement according to FIG. 10 with removed tool holder, cut along the line XVII-XVII of FIG. 10, in a side view and on a different scale.

DETAILED DESCRIPTION

Figure 3:
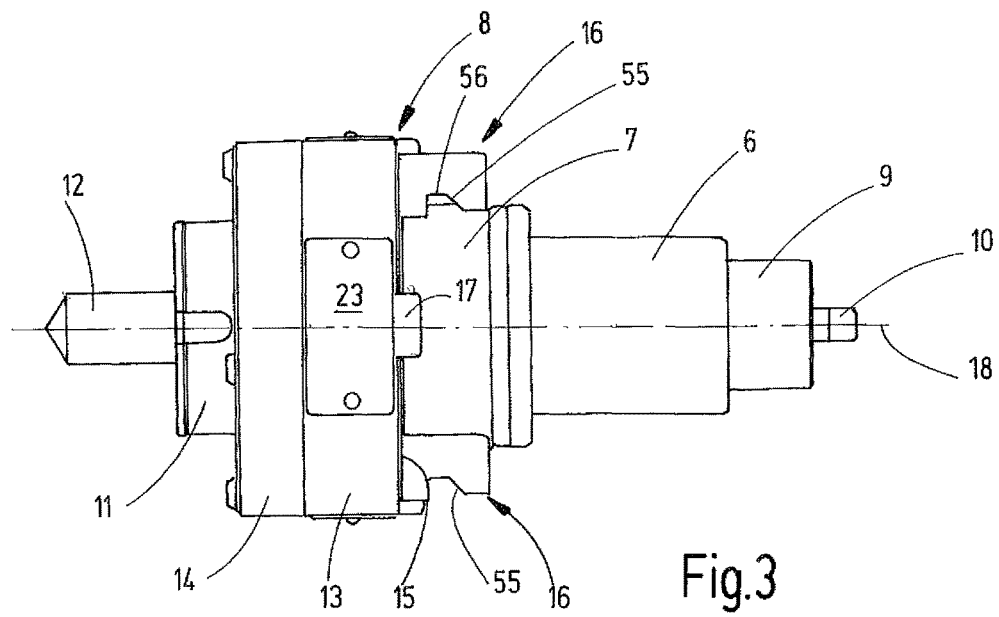
FIG. 3 shows the tool holder of the turret plate according to FIG. 1 in a schematic illustration in a side view and in a different scale.

The tool clamping device illustrated in FIG. 1 has a tool carrier 1 in the form of a turret plate, which is part of a known tool turnstile turret (not illustrated further) having radially arranged tools. The tool carrier 1 is formed as a regular polygon and carries at the periphery thereof flat support faces 2 for tool holders, of which one is indicated schematically at 3 and is illustrated perspectively in greater detail in FIG. 7. In the region of each support face 2, the tool carrier 1 is provided with a radially directed cylindrical receiving bore 4, visible from FIG. 2, which is formed as a stepped bore with a cylindrical portion 5 adjoining the support face 2 and which forms a socket for a tool holder 3. As can be seen by way of example from FIGS. 3 to 5 and 7, the tool holder 3 has a cylindrical shaft 6, which is formed with a cylindrical guide portion 7 of larger diameter and is received in the associated receiving bore 4 or in a portion 5 thereof when the tool holder 3 is inserted into the tool carrier 1. The shaft carries a housing 8, in which a spindle 9 coaxial with the shaft 6 is rotatably mounted. The spindle 9 is formed at one end thereof with a coupling 10 for a drive source provided in the region of the tool carrier 1 and is provided at the other end thereof with a collet chuck 11 for clamping a tool indicated at 12, for example a drill bit. The housing 8 is formed in two parts, wherein one part 13 is formed integrally on the shaft portion 7 and the other part 14 is screwed in the form of a cover to the part 13. Here, the arrangement is such that a flange portion protruding laterally beyond the shaft portion 7 and having a flat support face 15 is provided, with which the tool holder inserted into the socket of the tool carrier 1 rests on the support face 2 of the tool carrier 1 and in the region of which four anchoring rods 16 are provided, which are arranged in the vicinity of the four corners of the rectangular support face 15.

Figure 4:
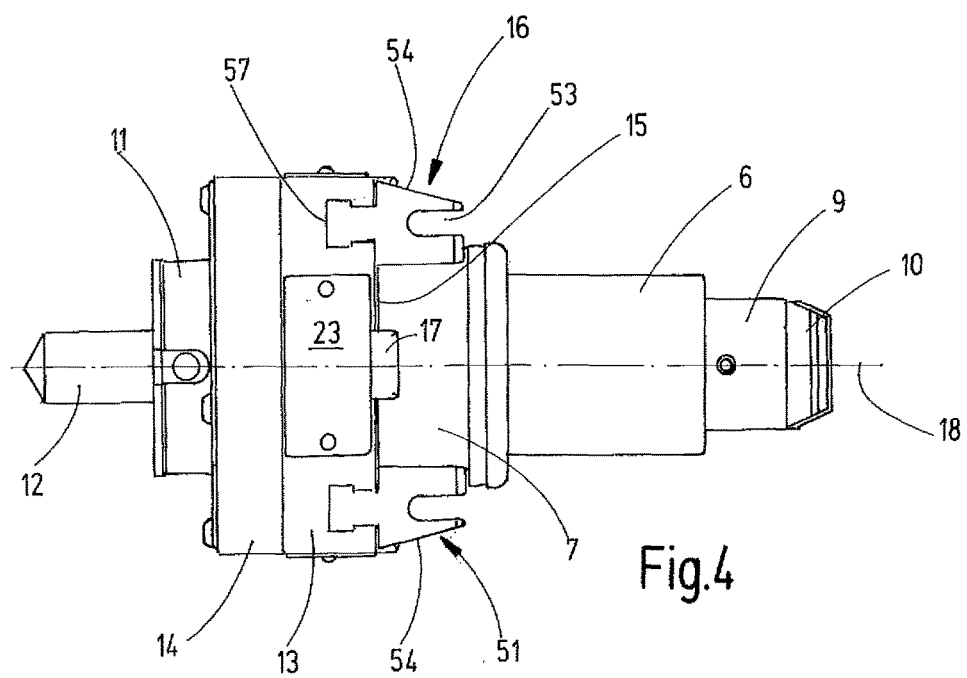
FIG. 4 shows the tool holder according to FIG. 3 in a side view rotated through 90°.
Figure 5:
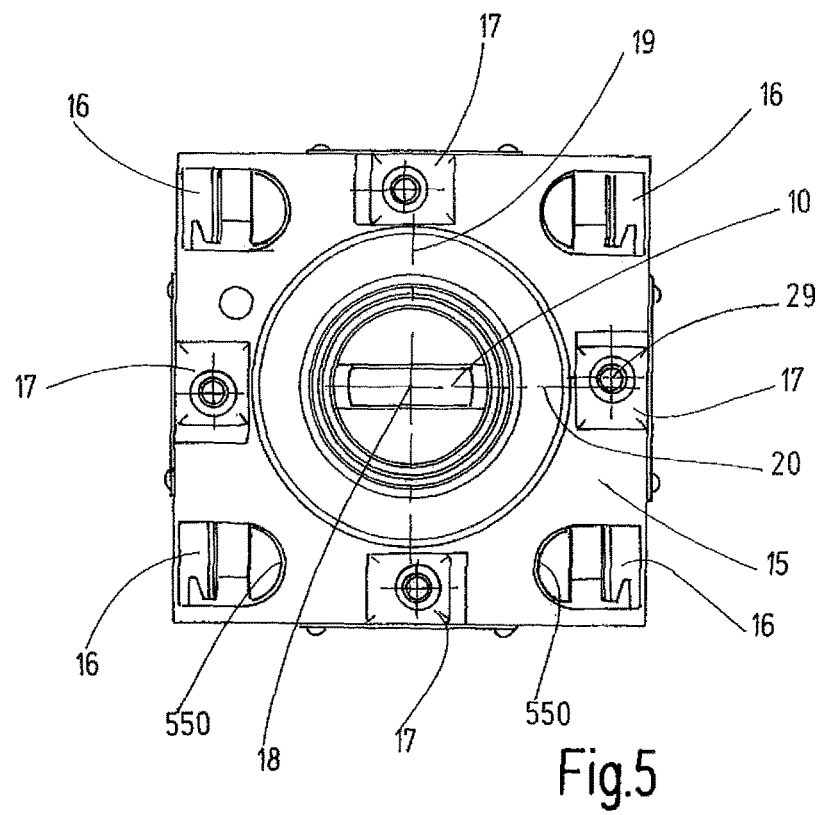
FIG. 5 shows the tool holder according to FIG. 3 in a shaft-side plan view.
Figure 6:
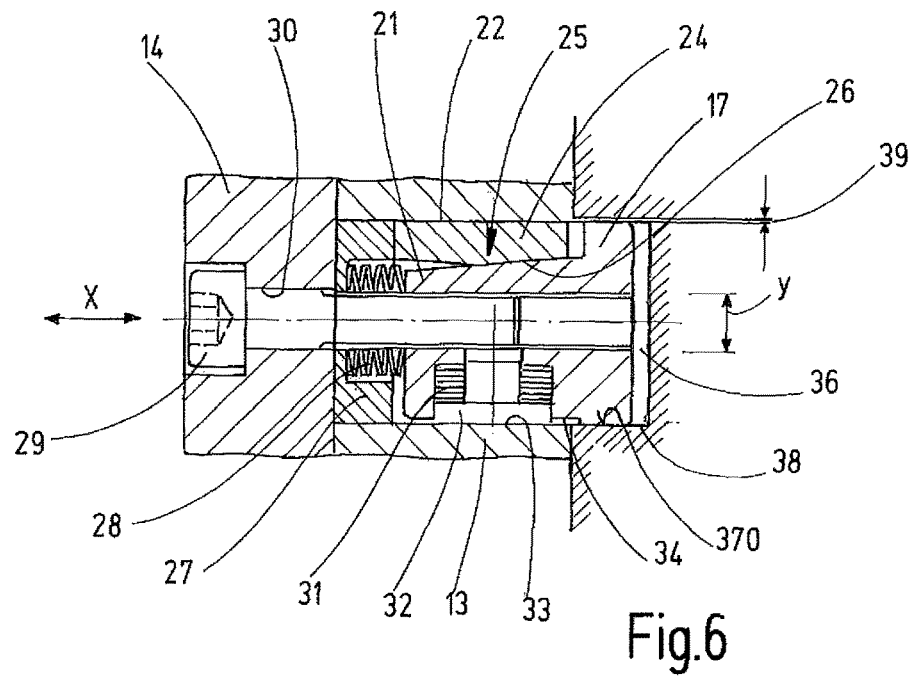
FIG. 6 shows an adjustment element of the tool holder according to FIG. 3 in axial section in a side view and on a different scale.

Four adjustment elements in the form of T-nuts 17 (see FIG. 5) are provided on the housing 8 of the tool holder 3 and are uniformly distributed around the axis 18 of the shaft 6. The T-nuts 17 are disposed in each case in pairs over two diameters 19, 20 arranged at right angles to one another, as is illustrated in FIG. 5, and protrude axially beyond the support face 15 of the tool holder 3 (FIGS. 3 and 4). The T-nuts 17 are substantially rectangular in cross section (FIG. 6) and are formed with an integrally moulded-on guide part 21, with which they are each received in a groove-like guide 22 of the housing part 13, which guide is rectangular in cross section, is parallel to the axis 18 of the shaft 6, and is covered outwardly by a fitted cover plate 23. A pressure plate 24 with an outwardly inclined wedge or sloping face 25 is inserted into the groove-like guide 22, which is delimited by parallel flanks and is rectangular in cross section, and forms a wedge transmission with a corresponding wedge face 26 formed on the guide part 21. In the axial direction the pressure plate 24 is supported via a spring sleeve 27 against the lid 14 of the housing 8. A disc spring set 28 is inserted into the spring sleeve 27 and biases the T-nut 17 in the direction pointing away from the support face 15 and designated in FIG. 6 by an arrow "X". An internal hexagon set screw 29 is screwed into a threaded bore of the T-nut 17 and guide part 21 thereof, which bore is substantially coaxial with the longitudinal axis of the guide 22, and extends through a bore 30 in the lid 14 and is adjustable from the front side of the tool holder 3. Alternatively, the set screw 29 may of course also be inserted in reverse, in such a way that the screw head thereof lies in the region of the T-nut 17 and is screwed into a corresponding threaded bore in the lid 14.

A recess is provided in the guide part 21 on the side opposite the wedge face 25, into which recess a second disc spring set 31 is inserted, which is supported on a spring plate 32 guided displaceably in the recess and pressed against the straight inner wall 33 of the guide opposite the wedge face 25. The guide part 21 is set back in the regions at 34 located within the guide 22 and facing the wedge face 26, such that the guide part 21, within the guide 22, has a certain transverse movability. The set screw 29, the guide part 21 with the wedge face 25, and the pressure plate 24 form, together with the disc spring sets 28, 31 and the spring plate 32, adjustment means for the T-nut 17. By rotating the set screw 29, the guide part 21, which is pressed via its wedge face 25 under bias by the spring plate 32 and the disc spring set 31 against the wedge face 26 of the pressure plate 24 and is thus held non-rotatably in the guide 22, is displaced with the T-nut 17 in the longitudinal direction against the action of the bias exerted by the first disc spring set 28. In so doing, the T-nut 17 is displaced parallel to the inner face of the guide 22, whilst at the same time the T-nut 17 performs a transverse movement indicated by a double-headed arrow "Y". The adjustment range of this transverse movement by way of example lies in a range of ±0.05 mm. The T-nuts 17 are manufactured very accurately in terms of their dimensions as precision T-nuts. A very accurate and sensitive adjustment in the "Y" direction is provided via the wedge transmission 25/26, whilst at the same time the adjustment means are self-locking, such that an adjustment of the T-nut 17 set once via the set screw 29 is maintained accurately.

As can be seen in particular from FIG. 2, two receiving grooves 35, 36, which are rectangular in cross section and are delimited by parallel flanks, are provided in the tool carrier 1 in the region of each of the support faces 2 thereof and intersect one another at right angles in the region of the receiving bore 4, in such a way that the point of intersection of the groove axes 35a, 36a lies on the axis 37 of the receiving bore 4.

The receiving grooves 35, 36, which are also to be referred to as keyways, receive the four T-nuts 17 of the tool holder 3 when the tool holder 3 is fitted via its support face 15 onto the support face 2 of the tool carrier and is fastened to the tool carrier 1 via the anchoring rods 16.

The dimensions of the T-nuts 17 are coordinated with the width of the receiving grooves 35, 35 in such a way that the T-nuts 17, when the tool holder 3 is fitted onto the tool carrier 1, have only a minor joint clearance in the order of approximately 0.02 mm or bear against the wall of the receiving groove under bias. The four T-nuts 17 of the tool holder 3 are arranged in such a way that each two mutually opposed T-nuts 17 engage with a receiving groove 35 or 36, wherein the T-nuts 17 are oriented such that the spring plates 32 of adjacent guides 22 are always located on the same side, as considered in a clockwise direction.

In the case of a tool holder 3 attached to the tool carrier 1, the T-nuts 17 bear with their bearing face 370 disposed opposite the pressure plate 24 against the side wall 38, for example of the receiving groove 36, in an accurately fitting manner, said side wall forming a dimensionally accurate planar bearing point. Due to the orientation of the T-nuts 17 in the tool holder 3, two bearing points, which are disposed on either side of the axis 37 of the receiving bore 4, are created in each of the receiving grooves 35, 36. By means of suitable adjustment of the four set screws 29, the four T-nuts 17 can be moved in the "Y" direction of FIG. 6 over an adjustment path corresponding at least to the joint clearance between the T-nuts 17 and the receiving grooves 35, 36. This adjustment movement makes it possible, via the T-nuts 17 and the receiving grooves 35, 36, to adjust the angular position of the tool holder 3 with respect to the tool carrier sensitively with maximum precision and also to displace the axis 18 of the shaft 6 and therefore of the tool in the tool holder 3 laterally with respect to the axis 37 of the receiving bore 4 and therefore to set or to correct an axial offset, for example in order to compensate for manufacturing tolerances. The tool holder 3 may thus be centred via the precision T-nuts 17 at the receiving grooves 35, 36 and displaced and adjusted precisely with respect to the tool carrier 1.

In practice, the tool holders 3 are pre-set on a socket corresponding to the tool carrier 1. This pre-setting can be reproduced exactly, such that the angular position and any offset can be transferred without clearance when the tool holder 3 is inserted into the socket of the tool carrier 1.

Instead of the described T-nuts 17, which are rectangular in cross section and are produced as precision T-nuts, for example with the fit 18H6, differently formed adjustment elements may also be used, which for example result in linear contact at the bearing points on the groove side walls. In principle, the receiving grooves 35, 36 may be arranged in a manner dependent on the design conditions of the tool carrier, even on indentations, protrusions or other suitable design elements. The joint clearance 39 illustrated in an exaggerated manner in FIG. 6 at 39 is irrelevant for the positional adjustment of the tool carrier, because the T-nuts 17 thereof bear with bias at the associated bearing points 38, such that, when the support face 15 of the tool holder 3 is braced on the support face 2 of the tool carrier 1, the clamping force exerted by the anchoring rods 16 onto the tool holder 3 does not impair the exactly pre-set position of the tool holder with respect to the tool carrier.

The devices for fastening the tool holder 3 to the tool carrier 1 have at least two, in the present case four, anchoring rods 16 extending at right angles to the support face 15 of the tool holder 3, which anchoring rods, as can be seen in particular from FIG. 5, are provided in a manner distributed uniformly about the axis 18. The anchoring rods 16 are visibly arranged on the tool holder 3 at a distance from one another and separately from the adjustment elements formed by the T-nuts 17. In the case of the square design of the support face 15 selected in the exemplary embodiment described, the T-nuts 17 are disposed in pairs on mutually opposed straight lines intersecting one another at right angles, on mutually opposed straight edges of the support face 15, whereas the anchoring rods 16, likewise mutually opposed in pairs, are arranged approximately on diagonals of the square support face 15. As can be seen in particular from FIGS. 7 and 8, each anchoring rod 16 has a substantially T-nut-shaped head part 42 delimited laterally by parallel flanks, the side walls 41 of said head part being delimited on one side by a face 43 curved in the manner of the arc of a circle and on the other side by a flat face 44 extending transversely at right angles. A shaft part 45, which is narrower than the head part 42, is connected to said head part and has flat side walls 46 extending parallel to the side walls 41 of the head part 42 and is connected to a clamping part 47. The clamping part 47, when the tool holder 3 is inserted into the socket of the tool carrier 1, is designed in a wedge-shaped manner pointing towards the tool carrier 1 in order to facilitate the insertion into the associated opening 72 of the tool carrier 1. The clamping part has a guide part 48, which adjoins the shaft part 45 and has two mutually opposed flat parallel guide faces 49, and the guide part 48 is then formed in a fork-shaped manner with two branches 50, 51, which define therebetween a through-opening 53 delimited laterally by parallel flanks. One branch 51, as can be inferred from FIGS. 4 and 7, is formed with a sloping face 54 tapering towards the spindle 9, whereas the other branch 50 is delimited by an outer face 550 extending at right angles to the support face 15 and curved in a circular manner in the present case.

Approximately triangular recesses are provided in both branches 50, 51 on the same end face in the side view, said recesses each being delimited on the lower side thereof by a sloping face 55. The sloping faces 55 of the two branches 50, 51 are parallel to one another and are disposed in a common plane, which rises towards the head part 42. They are axially distanced from the opposed delimitation 56 of the recess.

Figure 7:
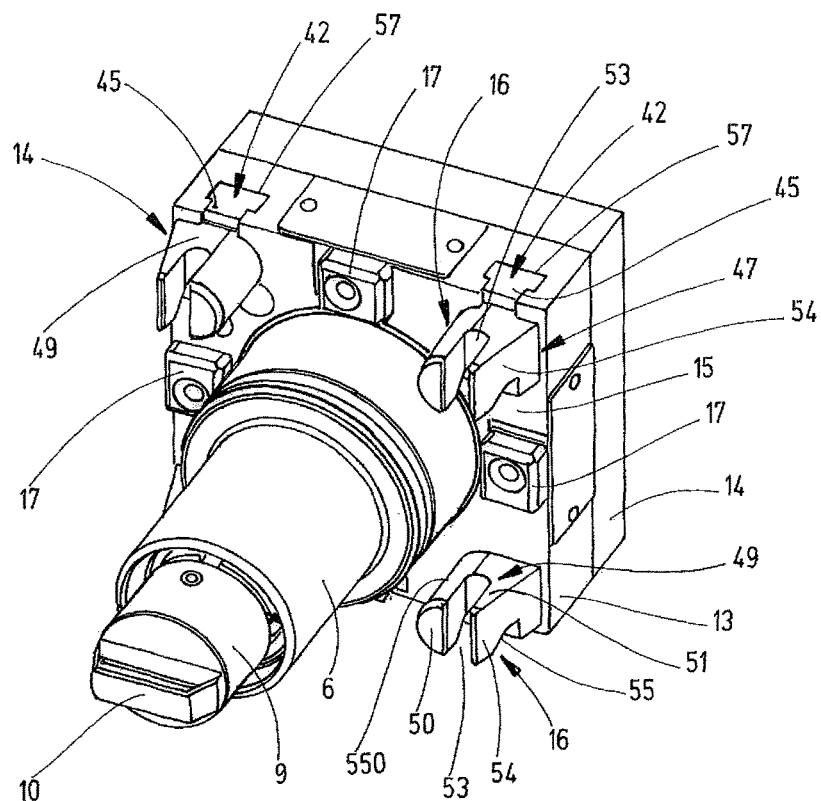
FIG. 7 shows the tool holder according to FIG. 3 in a perspective illustration.
Figure 10:
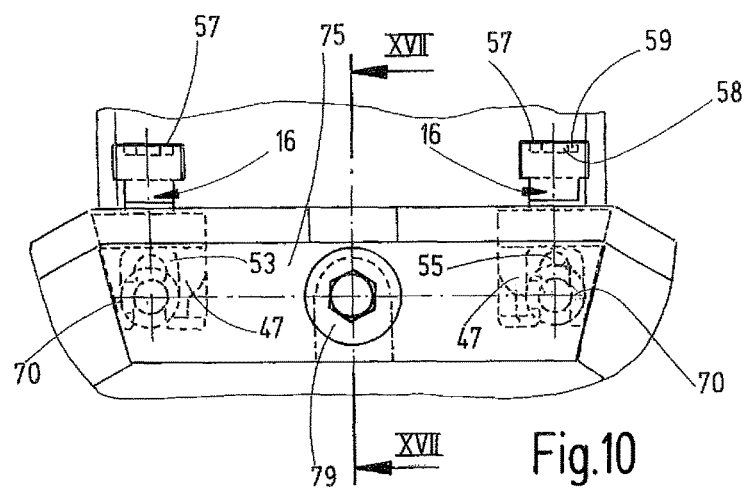
FIG. 10 shows a detail of the turret plate according to FIG. 1 with fitted tool holder, in a side view and in a different scale.
Figure 11:
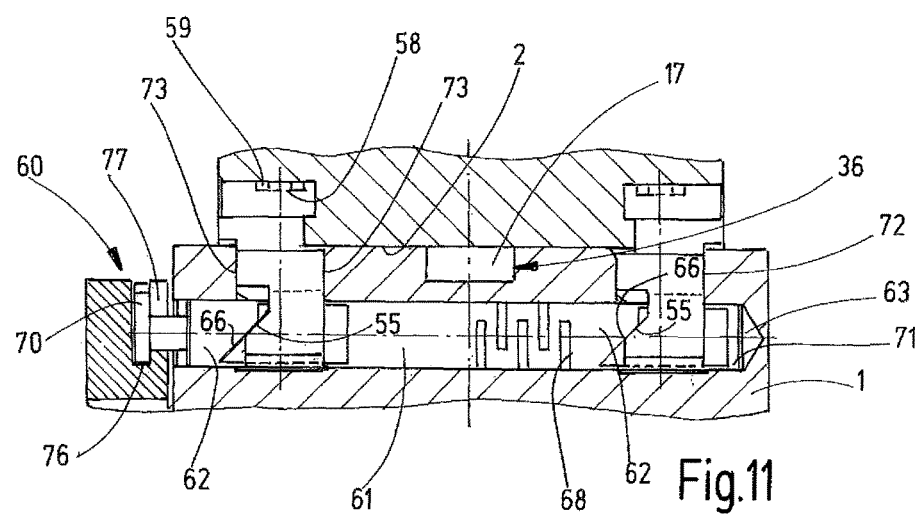
FIG. 11 shows the arrangement according to FIG. 10 in a side view and a partial sectional illustration, illustrating the clamped state of the fitted tool holder.

Each of the described anchoring rods 16 with its head part 42 and its shaft part 45 is received in a substantially T-shaped recess 57 of the housing part 13 of the tool holder 3, as can be inferred by way of example from FIGS. 7, 10 and 11. The anchoring rod 16 is mounted in the respective T-groove-shaped recess 57 so as to be transversely displaceable, wherein it is resiliently braced against the base of the T-groove-shaped recess 57 by an O-ring 59 inserted into a counterbore 58 on the upper side of the head part 42 and is therefore secured against sliding out unintentionally from the recess 57. The T-groove-shaped design of the recesses 57 and the described embodiment of the anchoring rod 16 with the guide faces 41, 46 ensures that each anchoring rod is mounted on the tool holder 3 in a manner oriented at right angles to the support face 15 and movable on the tool holder 3 transversely with respect to the axis 18 of the shaft 6 in a limited manner.

Figure 12:
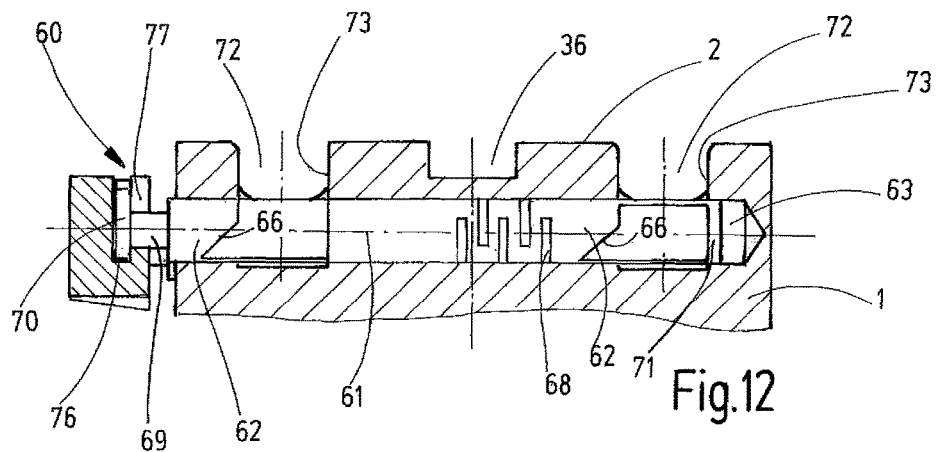
FIG. 12 shows the arrangement according to FIG. 11 in the unclamped state and without fitted tool holder, in a corresponding illustration.

A clamping apparatus 60, which can be seen for example from FIGS. 11 and 12, is provided on the tool carrier and engages, when the tool holder 3 is inserted into the socket of the tool carrier 1, with the anchoring rods 16 thereof and exerts an axial clamping force thereonto, under the effect of which the tool holder 3 is pressed via its support face 15 against the support face 2 of the tool carrier 1 with a force that is of such magnitude that the machining forces acting on the tool 12 when a workpiece is machined can be transferred with frictional fit to the tool carrier 1, without any significant transverse forces being exerted onto the clamped tool holder 3.

The clamping apparatus 16 has clamping elements guided movably in the tool carrier 1, which are formed in the illustrated exemplary embodiment as tension rods 61, which are each displaceable by associated actuation means between an active position according to FIG. 11, engaged in the clamping direction with the clamping part 47 of the associated anchoring rod 16 of a tool holder 3 fitted onto the tool carrier 1, and a rest position according to FIG. 12, releasing the associated anchoring rod 16. The tension rods 61 are guided displaceably in the tool carrier 1 between the active position and the rest position and are each formed with two engaging parts 62, which can be brought into engagement with the clamping parts 47 of the associated anchoring rod 16. The substantially cylindrical tension rods 61 are displaceable in corresponding cylindrical bores 63 (FIGS. 11 and 12) of the tool carrier 1 parallel to the respective support face 2 thereof, wherein each support face 2 is associated with two tension rods 61, the spacing between which corresponds to the spacing between the associated anchoring rods 16 engaged therewith of a tool holder 3 fitted onto the tool carrier 1 (see FIG. 10). The structure of the tension rods 61 can be inferred in particular from FIGS. 13 and 14:

Each of the cylindrical tension rods 61, of which the longitudinal axis is designated by 64, has two web-like portions 65, which are each flanked in parallel and are symmetrical with respect to the longitudinal axis 64 and are formed on one side—here the left side in FIGS. 13 and 14—with two laterally protruding sloping faces 66 of identical design, which sloping faces in the embodiment shown in FIGS. 13 and 14 are spatially oriented identically and extend towards the longitudinal axis 64 starting from the periphery of a cylindrical guide part 67 of the tension rod 61, said guide part being coaxial with the longitudinal axis 64. The thickness of the webs 65 and the arrangement and orientation of the sloping faces 66 are coordinated with the anchoring rods 16, in such a way that when the tool holder 3 is fitted onto the tool carrier 1 the clamping part 47 of in each case two anchoring rods 16 of the tool holder 3 surrounds a web 65 of the associated tension rod 61 in a fork-shaped manner (FIG. 10) and the corresponding sloping faces 66 of the tension rod 61 come into engagement with the sloping faces 55 of the respective anchoring rod 16 and can cooperate therewith in the manner of a wedge transmission in order to generate the axial clamping force. Here, the arrangement is such that each tension rod 61 is associated with two anchoring rods 16 and the tension rod with its two sloping faces 66 can act simultaneously in the clamping direction on the two anchoring rods 16 in the event of a clamping operation of the tool holder 3.

In the region between the two sloping faces 66, slots 68 starting alternately from mutually opposed sides are provided in the tension rod 61 and act as expansion joints in such a way that the tension rod is resilient in this region in the longitudinal direction. The slots 68 are dimensioned such that manufacturing tolerances both of the tension rod and of the anchoring rods 16 engaged therewith and of the support thereof on the tool holder 3 are compensated for and a predefined minimum tensile force is ensured during a clamping operation at the anchoring rods 16 cooperating with the collet chuck.

Each tension rod 61 is lastly formed with an annular groove 69 on its end arranged outwardly in the state inserted into the tool carrier, said annular groove being adjoined by a flattened head piece 70, which in the inserted state of the tension rod is located beside the tool carrier 1 at an axial distance (see FIGS. 11 and 12). At the opposite end, the web 65 is adjoined by a cylindrical guide part 71, which supports the tension rod 61 against the wall of the bore 63 in the inserted state.

As can be seen in particular from FIGS. 2 and 10, each support face 2 of the tool carrier 1 is associated with two tension rods 61 parallel to one another, which are mounted displaceably in corresponding bores 63 in the tool carrier 1, the spacing between said tension rods corresponding to the spacing between the anchoring rods 16 engaging with the tool holder 3 when said tool holder has been fitted on. Groove-shaped recesses 72 are provided in the tool carrier 1 in the region of the support face 2 thereof in the region above each of the tension rods 61 and are delimited on two sides by parallel faces and are additionally formed such that, via their parallel side faces 73, they guide a received anchoring rod 16 at the guide part 48 thereof. When the tension rods 61 are transferred into the active position, the associated anchoring rods 16 are pressed against the respective side faces 73 and at the same time are drawn in the direction of the tool carrier 1.

The illustrated clamping device has actuation means, by which the clamping apparatus can be driven to act on at least two anchoring rods 16 jointly in the sense of the pressing of the two support faces 2, 15 towards one another by means of the generated axial clamping force. The actuation means designated generally in FIG. 2 by 74 have, for each support face 2, an actuation element accessible from the outer side of the tool carrier 1 in the manner visible from FIGS. 1 and 2 and provided in the form of a dimensionally stable tensioning bar 75, which is supported against the tool carrier 1 and of which the details can also be seen in particular from FIGS. 15 and 16. Each of the tensioning bars 75 is approximately trapezoidal, wherein, in the manner that can be inferred from FIG. 1, the tensioning bars 75 of the individual support faces 2 supplement each other around the tool carrier 1 illustrated there as a turret plate to form a closed polygon. Each of the tensioning bars 75 has two pocket-shaped recesses 76 arranged on its side facing the tool carrier 1, the wall of said recesses facing the tool carrier being formed with a groove-shaped recess 77 open at the edge. In the mounted state, the head piece 70 of a tension rod 61 is received in each of the pocket-shaped recesses 76 in a manner secured against rotation and with clearance, as can be seen in particular from FIGS. 10 to 12. By means of a corresponding movement of the tensioning bar 75, the two tension rods 61 mechanically coupled thereto can thus be actuated with a certain clearance in both longitudinal directions. Alternatively, the tension rods 61 could also be received uniquely in bores of the tensioning bar 75, or connected to the tensioning bar for example by a screw or a transverse bolt to mention just one further embodiment.

A through-bore 78 is provided in the tensioning bar 75 centrally between the two recesses 76 and serves to receive a clamping screw 79 and leads on the inner side facing the tool carrier 1 into a groove-like indentation 80, against the base of which it is captively supported via a fitted-on snap ring 81. The clamping screw 79 is screwed in a bore 83 of the tool carrier 1 via a wire thread insert 82 serving as wear protection. It makes it possible to displace the tensioning bar 75 and therefore the two tension rods 61 coupled thereto between the active position shown in FIG. 11, in which the tension rods 61 are engaged with the associated anchoring rods 16 of the fitted-on tool holder 3 and the tensioning bar 75 is located at a short distance from the tool carrier 1, and the rest position according to FIG. 12, in which the anchoring rods 16 are released and the tensioning bar 75 is situated at a greater distance from the tool carrier. As the tensioning bar 75 is transferred into the active position, the screw head of the clamping screw 79 bears against the tensioning bar 75, whereas during the movement into the rest position the snap ring 81 fitted onto the clamping screw 79 supported against the tool carrier 1 comes to bear against the inner face of the tensioning bar 75.

The new tool clamping device described above functions as follows:

When a tool holder is to be changed the tool holder 3 to be newly fitted is inserted via its shaft 6 into the receiving bore 4 of the tool carrier 1, wherein the adjustment elements 17, which have been exactly set and precisely adjusted on the basis of a template, are inserted into the receiving grooves 35, 36 of the tool carrier. The adjustment elements 17 come to bear at their bearing points on the groove side walls 38 (FIG. 6) under a predetermined bias and position the tool holder 3 accurately and at a correct angle with respect to the tool carrier 1. During this placing movement the four anchoring rods 16 enter the groove-shaped recesses 72 of the tool carrier 1, which is facilitated in that the anchoring rods 16, as explained above, are wedge-shaped and protrude further beyond the support face 15 of the tool holder 3 than the adjustment elements 17, such that the anchoring rods 16 already form a certain insertion aid or pre-orientation for the adjustment elements 17. Since the anchoring rods 16 are connected to the tool carrier 3 in a transversely displaceable manner, no transverse forces can be exerted by said anchoring rods onto the tool carrier 3, said tool carrier thus retaining in an unimpeded manner the exact positioning predefined by the adjustment elements 17, in a manner held free from transverse forces.

As the insertion movement is continued, the anchoring rods 16 in a fork-shaped manner overlap the webs 65 of the tension rods 61 associated therewith, said anchoring rods being situated in their rest position illustrated in FIG. 12. In addition, the anchoring rods 16 are guided and supported laterally at the side walls 73 of the groove-shaped recesses 72 of the tool carrier 1.

As soon as the tool holder 3 is fitted far enough onto the tool carrier 1 that the adjustment elements 17 engage with the receiving grooves 35, 36 and the anchoring rods 16 surround their tension rods 61 in a fork-shaped manner, the clamping screw 79 is tightened, with the result that the tensioning bar 75 pushes the two tension rods 61 forwards into the active position illustrated in FIG. 11, in which the anchoring rods 16 and together therewith the tool holder 3, via the sloping faces 66 of the tension rods in cooperation with the sloping faces 55 of the anchoring rods 16, are drawn against the tool carrier 1, and the support face 15 of the tool holder is pressed by the generated axial clamping force against the support face 2 of the tool carrier. Here, the machining forces acting on the tool during the machining of a workpiece are diverted with a frictional fit into the tool carrier 1, without influencing the exact positioning of the tool holder 3 ensured by the adjustment elements 17 and the receiving grooves 35, 36. The sloping faces 55, 56 of the anchoring rods 16 of the tension rods 61 are selected such that a self-locking effect is produced in the clamped state.

In order to release the tool holder 3 from the tool carrier 1, the clamping screw 79 supported against the tool carrier 1 is rotated in the release direction until the two tension rods 61 coupled thereto assume the rest position according to FIG. 12, in which the anchoring rods 16 are released from the sloping faces 66 of the tension rods 61 and the tool holder 3 can therefore be removed in an unhindered manner from the tool carrier 1.

Since merely a single actuation means in the form of the clamping screw 79 has to be actuated in order to change a tool and this can be performed quickly and easily, the tool clamping device is provided with a tool quick-change system. The set screw 79 is additionally easily accessible from the outer side of the tool carrier, as shown by FIGS. 1 and 2 for example. In addition, the clamping apparatus 60 with its tension rods 61 in cooperation with the anchoring rods 16 requires only very small modular design modifications at the tool carrier 1, i.e. in the specific case of the illustrated exemplary embodiment merely additional bores 63, 83 and four groove-shaped recesses 72 have to be provided on the tool carrier for each support face 2.

Figure 8:
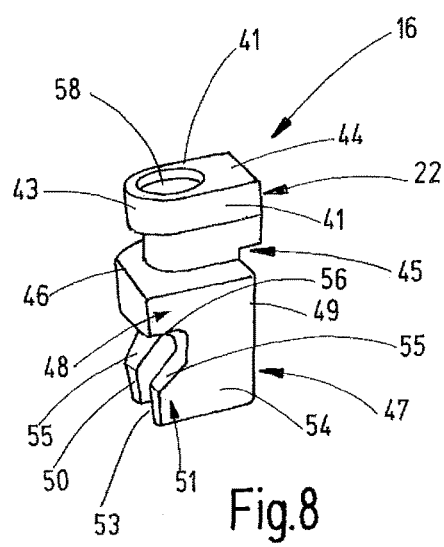
FIG. 8 shows an anchoring rod of the tool holder according to FIG. 7 in a perspective illustration and on a different scale.
Figure 9:
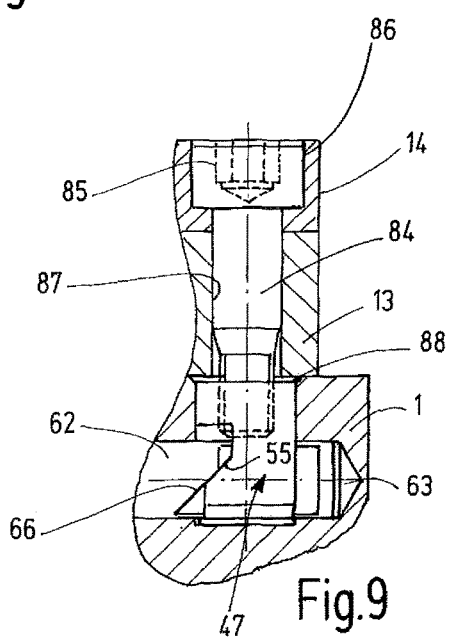
FIG. 9 shows an anchoring rod of the tool holder according to FIG. 7 in another embodiment in axial section in a side view and on a different scale.
Figure 21:
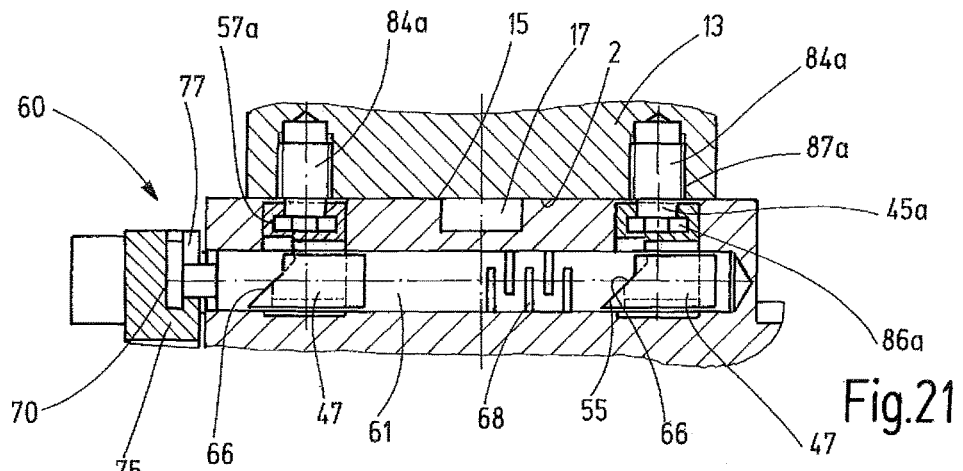
FIG. 21 shows a modified embodiment of the anchoring rod according to claim 9 in an illustration similar to FIG. 11.

The connection of the anchoring rods 16 to the tool holder 3 is not limited to the exemplary embodiment explained above in particular with reference to FIGS. 7 and 8. FIG. 9 shows an exemplary modified embodiment, in which the engagement part 47 already explained with reference to FIG. 8 is screwed with a cylinder screw 84, which is received in a transversely movable manner via its screw head 85 in the associated T-groove-shaped recess 57 of the tool holder 3. Alternatively, the arrangement may also be such that, as illustrated in FIG. 9, the cylinder screw 84 is received with clearance via its head 85 in a corresponding counterbore 86 of the housing lid 14 of the tool holder 3 and extends via its shaft with radial clearance through a corresponding bore 87 in the housing lower part 13, such that the necessary transverse movability with respect to the tool holder 3 is provided. An advantage of this variant lies in the fact that tool holders known for example from DE 199 40 330 C2 can be fitted onto tool carriers 1 which are provided with the new quick-change system. Instead of the four fastening screws, with which a known tool holder has been screwed to the tool carrier, the four cylinder screws 84, which are easily screwed onto the clamping parts 47 of the anchoring rods, are now provided. A resilient member in the form of a disc spring 88 and arranged between the clamping part 47 and the tool holder lower part 13 generates an axial bias between the anchoring rod 16 and the tool holder 3, which bias can be set such that, once it has been overcome, the anchoring rod 16 is movable transversely in the range of the clearance freedom between the bore 87 and counterbore 86 and the cylinder screw 54. It is also conceivable, as illustrated in FIG. 21, to form the clamping part 47 with a T-groove 47, with which a flattened head part 47b of a screw arc 84b screwed into the housing part 14 engages, in such a way that a sort of dovetail connection with limited transverse displaceability is produced.

Figure 18:
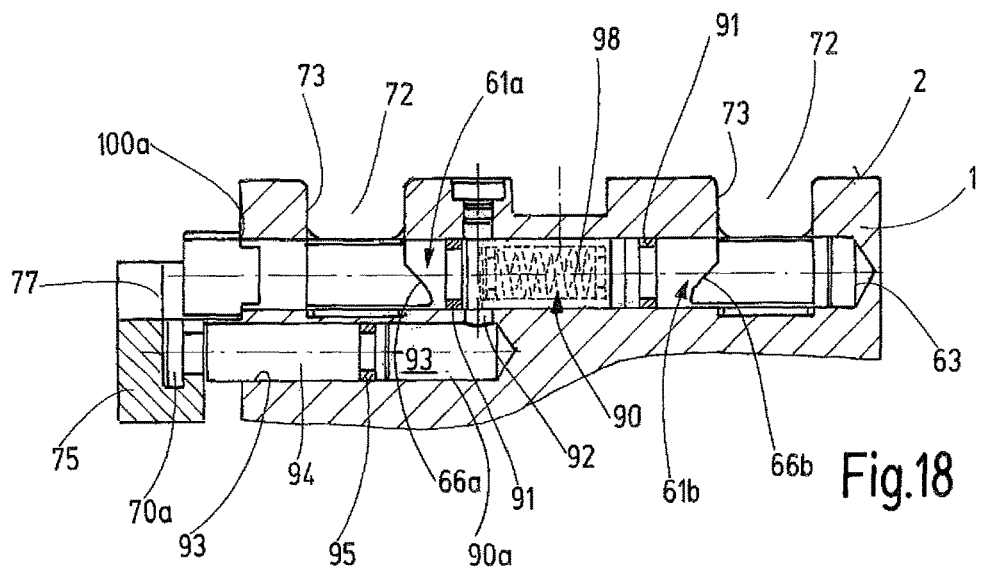
FIG. 18 shows a detail of the turret plate according to FIG. 1 in accordance with the illustration according to FIG. 12, showing a modified embodiment of the clamping apparatus in axial section in a side view.

The described clamping apparatus 60 is accessible in a variety of modifications within the scope of the invention. It must ensure that, in the confined space conditions of a tool holder fitted via its support face onto the support face of a tool carrier, for example a turret plate, there is no influence of the exact position determined by dedicated, separate adjustment elements in cooperation with receiving grooves in the tool carrier. Two such modified embodiments are illustrated by way of example in FIGS. 18 to 20:

The embodiment according to FIG. 18 is in principle similar to that according to FIGS. 11 and 12, wherein in FIG. 18 the state in which the tool holder is removed is illustrated. Parts identical to those in FIGS. 11 and 12 are provided with like reference signs with the addition "a" or "b" and will not be explained again. The tension rod is formed here in two parts with two parts 61a, 61b, which are arranged pointing towards one another via their sloping faces 66a, 66ba. The sloping faces 66a, 66b cooperate with the sloping faces 55 of accordingly formed anchoring rods 16 in the manner already described in principle. A cylinder chamber 90 is delimited in the bore 63 receiving the tension rod parts 61a, 61b, more specifically in the region between the two sloping faces 66a, 66b, and is closed in a sealed manner on either side by ring seals 91 arranged on the tension rod parts 61a, 61b. A connection line 92 leads in the cylinder chamber 90 to a piston bore 93, in which a piston pin 94 is guided displaceably and carries a seal 95, with which a second cylinder chamber 90a filled with a pressure medium is closed in a sealed manner. The piston pin 94 is connected to a flattened head part 70a, to which it is mechanically coupled at the tensioning bar 75 in the manner already explained with reference to FIGS. 15 and 16.

Figure 19:
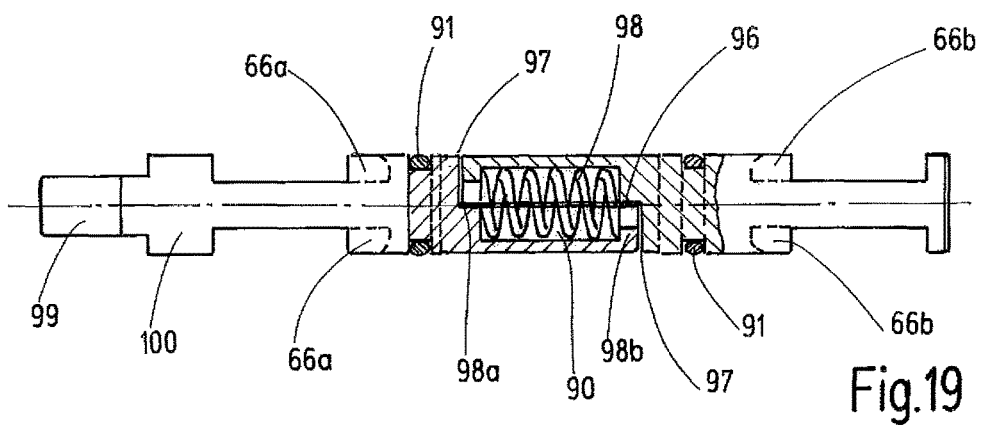
FIG. 19 shows a tension rod of the clamping apparatus according to FIG. 18 in a partially sectional side view and on a different scale.

As is clear from FIG. 19, the two tension rod parts 61a, 61b overlap one another in the region of the coaxially arranged cylinder chamber 90 enclosed by said parts. Said parts are arranged flat against one another at 96, such that they are guided against one another in a manner secured against rotation. Two radial gaps 97, which are connected in terms of pressure medium to the connection line 92 via an accordingly tapered region of the two tension rod parts 61a, 61b, lead into the cylinder chamber 90. In addition, a compression spring 98 is arranged in the cylinder chamber 90 and attempts to draw the two tension rod parts 61a, 61b into the position according to FIG. 19 directed towards one another in the axial direction. The compression spring 98 is disposed in the semi-cylindrical parts of the two tension rod parts 61a, 61b and is supported at each end against spring abutments 98a and 98b respectively.

In order to "close" the clamping apparatus 60a, the tensioning bar 75, once the tool holder 3 has been inserted, moves forwards from its rest position according to FIG. 18 in a manner directed to the right into its active position by corresponding actuation of the pressure screw 79. Here, pressure medium displaced by the piston pin 94 from the second cylinder chamber 90a flows via the gaps 97 into the cylinder chamber 90 and forces the two tension rod parts 61a, 61b away from one another, such that the sloping faces 66a, 66b thereof come into engagement with the sloping faces 55 of the anchoring rods 16 in the clamping direction as can be seen from FIG. 20. In order to "release" the clamped connection, the tensioning bar 75 is brought again into the rest position according to FIG. 18 via the pressure screw 79, whereby the compression spring 98 can move the two tension rod parts towards one another again and can bring the sloping faces 66a, 66b out of engagement again with the anchoring rods 16.

The tension rod part 61b carries, on the actuation side of the quick-change system, a flattened portion 99, which engages with the groove-like recess 77 of the tensioning bar 75 and serves as an anti-twist means for the tension rod parts 61a, 61b. The flattened portion is adjoined by a collar 100, which serves as an axial stop 100a on the tool carrier.

Figure 20:
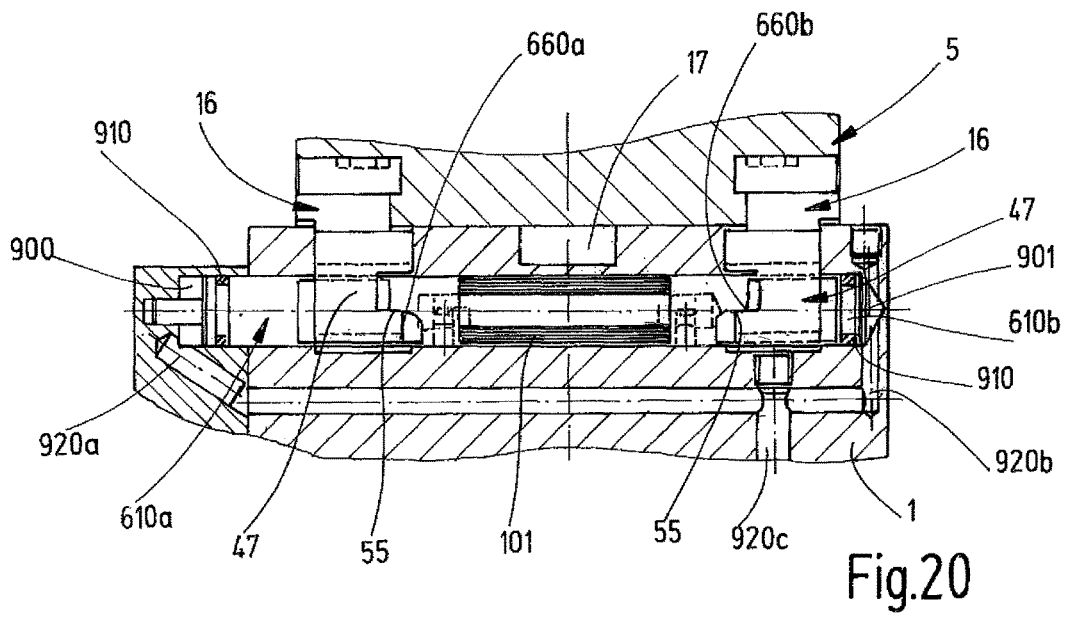
FIG. 20 shows the arrangement according to FIG. 18, in a modified embodiment with fitted tool holder in a corresponding sectional illustration.

The further modified embodiment 60b of the clamping device illustrated in FIG. 20 is also actuated by pressure medium and is formed with two-part tension rod parts 610a and 610b, which in principle are formed in a manner similar to that shown in FIG. 19. A compression spring in the form of a disc spring set 101 is arranged between the two tension rod parts 610a, 610b and endeavours to push the two tension rod parts 610a, 610b away from one another, such that the sloping faces 660a, 660b thereof come into engagement with the sloping faces 55 of the anchoring rods 16 in the manner already described. The two tension rod parts 610a, 610b are sealed at the end face by seals 910 with respect to two pressure chambers 900 and 901 acting against their end faces. Pressure medium lines 920a and 920b, which branch off from a common pressure medium supply line 920c connected to a pressure medium controller (not shown in greater detail) in the tool carrier 1, lead into the two pressure chambers 900, 910.

In order to transfer the tension rod parts 610a, 610b from the active position illustrated in FIG. 20, in which the axial clamping force acts on the anchoring rod 16, into the rest position corresponding to FIG. 18, each of the two pressure chambers 900, 901 is acted on with pressure medium via the pressure medium supply line 920c and the connection lines 920a, 920b, in such a way that the tension rod parts 610a, 610 are brought out of engagement via their sloping faces 660a, 660b with the anchoring rods 16 and are brought into the rest position again, pressing together the disc spring set 101.

In the exemplary embodiment according to FIG. 20, no tensioning bar 75 is provided, and instead the tension rods are driven jointly by a pressure medium, in particular hydraulically. It is also conceivable in principle, in the previously described embodiments, to move the tensioning bar 75 between its rest position and its active position by a pressure-medium-actuated actuation means, for example a hydraulic cylinder, instead of by the clamping screw 79. In the embodiment according to FIG. 20 it is also conceivable for example to close the pressure medium supply line 920c with an adjustable pressure screw, such that the pressure medium contained in the line system and the pressure chambers 900, 901 can be pressurised or depressurised by adjustment of the pressure screw.

To conclude, it should be mentioned that embodiments are also conceivable in which the anchoring rods 16 are arranged resiliently on the tool holder 3 or are formed themselves resiliently such that no significant transverse forces are exerted onto the tool holder 3 as the anchoring rods are clamped, i.e. the tool holders must in any case remain relieved of transverse forces to such an extent that the bearing of the adjustment elements thereof at the bearing points in the receiving grooves is not impaired.

In the alternative embodiment of the anchoring rods illustrated in FIG. 21, the arrangement is the same in principle as in FIG. 11, but with the difference that, similarly to FIG. 9, the anchoring rod has a threaded bolt 85a. The threaded bolt 84a is screwed into a corresponding threaded bore 87a of the housing lower part 13 of the tool holder 3. A neck part 45a of the threaded bolt 84 protrudes beyond the support face 15 of the tool holder and carries a flattened plate-shaped head part 86a. The head part 86a is received in a guide groove 57a forming part of a dovetail guide, said guide groove being formed integrally on the clamping part 47 of the anchoring rod. In this way, the tool holder 3 in the unclamped state retains a limited lateral movability with respect to the tool carrier 1. For the rest, parts identical to the embodiments according to FIGS. 9, 10 and 11 are designated by like reference signs and will not be discussed again.

In the case of the exemplary embodiments described above, tool holders 3 are explained that each carry four adjustment elements 17, which, when a tool holder is fitted on the tool carrier 1, bear under resilient bias at the bearing points associated therewith on the side wall 38 of the associated receiving groove of the tool carrier. Embodiments are also conceivable in which fewer than four adjustment elements or even merely a single adjustment element 16 is/are sufficient because, for example, the demands on the positioning accuracy are less or corresponding use conditions are present. The adjustment elements 17 may also be formed arbitrarily, for example in the form of cylinders, journals, prisms, etc. or differently shaped bodies. In certain embodiments the adjustment elements may also be resilient per se, which can be achieved for example by slots open at the edge or the like. Lastly, it also lies within the scope of the invention to use adjustment elements that do not allow any displacement, but instead are connected rigidly in a correctly positioned manner to the part carrying the support face. The receiving grooves also do not necessarily need to be formed as intersecting grooves 36, 37, but instead can also be formed as recesses of a different type, even in the form of bores. The term "receiving grooves" is to include all of these many designs of what are generally considered to be indentations. The receiving grooves also do not need to be arranged directly in the receiving face, for example of the tool carrier; embodiments are also conceivable in which they are provided on a part connected to the tool carrier.

It must also be mentioned that, in the described exemplary embodiment, the adjustment elements 17 and the anchoring rods 16 are provided on the tool holder 3, whereas the clamping device 60 cooperating with the anchoring rods is housed in the tool carrier 1. It also lies within the scope of the invention for the arrangement to be reversed, i.e. for at least one adjustment element 17 to be arranged on the tool carrier 1a in the region of the support face 2a thereof, protruding axially therebeyond, as indicated schematically in FIG. 22. Accordingly, corresponding receiving grooves 360 are then provided on the tool holder 3 in the region of the housing part 13 thereof carrying the support face 15, one of said receiving grooves being indicated purely schematically in FIG. 23. The anchoring rods 16 can be fastened in this embodiment to the four through-bores 87 by way of example by means of threaded bolts 84 in the manner visible from FIG. 9, wherein the anchoring rods may also be formed in accordance with the modified embodiment according to FIG. 21.

Alternatively, however, the anchoring rods in the embodiment according to FIG. 21 may also be screwed for example via their threaded bolts 84a into corresponding threaded bores in the region of the support face 2 of the tool carrier 1, whereas the support face 15 of the tool holder 3 with openings forms openings, similarly to the openings 72 of FIG. 2, for the anchoring rods, and the clamping apparatus 60 is housed in the housing part 13 of the tool holder 3. This alternative arrangement is easily understandable for example on the basis of FIGS. 11 and 12 when the part designated by reference sign 1 is understood as housing part 13.

Figure 22:
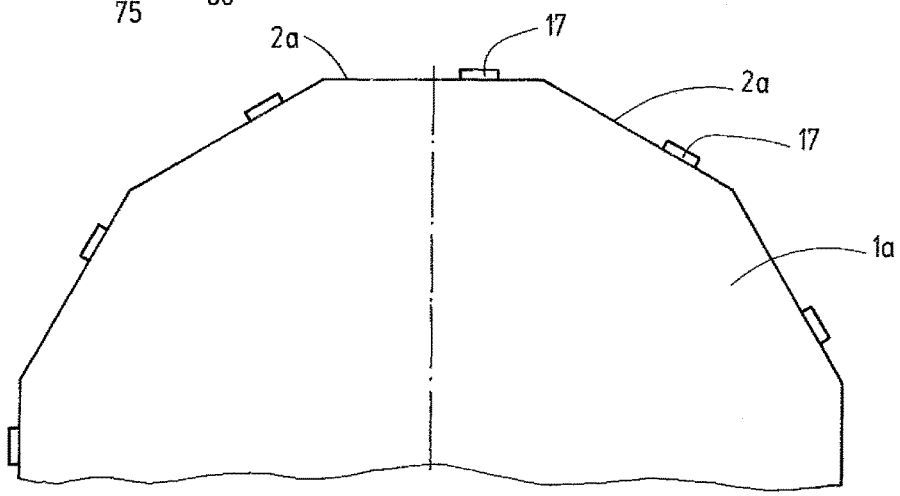
FIG. 22 shows a modified embodiment of a tool carrier according to the invention in a schematic partial illustration and a side view.
Figure 23:
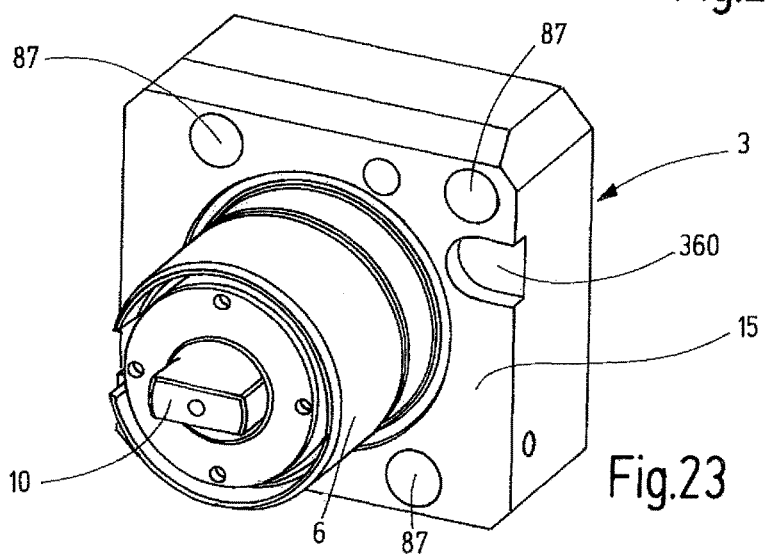
FIG. 23 shows a modified embodiment of a tool holder according to the invention in a schematic perspective illustration.

It should also be mentioned that the bores 87 of the tool holder illustrated in FIG. 22 can also be used to connect the tool holder in individual stations to the tool carrier 1 in the conventional manner, i.e. alternatively to the clamping apparatus 60, for which purpose corresponding threaded bores can also be provided for example in the region of the support face 2 and receive threaded bolts 84 (FIG. 9).

What is claimed is:

1. An apparatus comprising a tool clamping device comprising: a tool holder (3) configured to hold a tool and be inserted into a socket of a tool carrier (1), the tool holder comprising:
   a support face (15) associated with the tool carrier's support face (2), one of:
      the tool holder (3) further comprises at least one adjustment element (17) protruding axially in an axial direction beyond the tool holder's support face (15), wherein the at least one adjustment element (17) is configured to bear on at least one bearing point associated with the at least one adjustment element formed on the tool carrier (1) when the tool holder is inserted into the socket, wherein the at least one bearing point is arranged on a wall (38) of at least one receiving groove (35, 36) formed on the tool carrier, or
      the tool holder (3) further comprises a wall (38) of at least one receiving groove (35, 36) formed on the tool holder, wherein the wall (38) includes at least one bearing point configured to, when the tool holder is inserted into the socket, bear at least one adjustment element (17) protruding axially beyond the tool carrier's (1) support face;
   devices configured to fasten the tool holder to the tool carrier, the devices comprising at least two anchoring rods (16), which are arranged at right angles to the support face (15) of the tool holder or the tool carrier and are arranged on the tool holder (3) or the tool carrier (1) at a distance from one another and separately from the at least one adjustment element, a clamping device (60) provided on the tool carrier or the tool holder and, when the tool holder is inserted into the socket, is configured to act on the anchoring rods (16) during a clamping operation and to exert an axial clamping force onto said anchoring rods,
   wherein the tool holder (3) during the clamping operation is held free from transverse forces influencing the bearing of the at least one adjustment element (17) at the bearing point thereof on the wall (38) of the at least one receiving groove (35, 36), and
   wherein the clamping device (60) comprises an actuation device configured to generate an axial clamping force acting on the at least two anchoring rods (16) jointly by pressing the two support faces (2, 15) towards one another by the generated axial clamping force.

2. The apparatus according to claim 1, wherein the at least two anchoring rods (16) are arranged so as to be transversely movable to a limited extent.

3. The apparatus according to claim 1 wherein individual ones of the at least two anchoring rods (16) comprise a head part (42), a shaft part (45), and a clamping part (47) connected to the shaft part, of which at least the head part (42) is received with clearance in a recess (57) on the tool holder (3) or the tool carrier (1).

4. The apparatus according to claim 2, wherein individual ones of the at least two anchoring rods (16) comprise a clamping part (47), which is provided with a thread for receiving a threaded bolt (84).

5. The apparatus according to claim 3, wherein the clamping device (60) comprises clamping elements guided movably in the tool carrier (1) or the tool holder (1), which clamping elements are individually displaceable between an active position, engaged with the clamping part (47) of an associated anchoring rod (16) of the at least two anchoring rods (16) in the clamping direction, and a rest position, releasing the associated anchoring rod (16).

6. The apparatus according to claim 5, wherein the clamping elements are formed as tension rods (61), which are guided displaceably in the tool carrier (1) or the tool holder (3) and carry at least one engagement part (62) cooperating with the clamping part (47) of the associated anchoring rod (16).

7. The apparatus according to claim 6, wherein the at least one engagement part (62) has at least one wedge face (66) and the associated anchoring rod (16) is provided on the clamping part (47) thereof with at least one complementary wedge face (55) and, when the tension rod (61) is in the active position, the wedge faces (66, 55) associated with one another of the engagement part (62) and of the anchoring rod (16) are engaged with one another.

8. The apparatus according to claim 6, wherein the clamping part (47) is configured to surround the associated tension rod (61) in a fork-shaped manner.

9. The apparatus according to claim 1, wherein the at least two anchoring rods (16) are guided laterally on the tool carrier (1) or the tool holder (3).

10. The apparatus according to claim 6, wherein the tension rods are individually formed in two parts.

11. The apparatus according to claim 10, wherein the two tension rod parts (61a, 61b) are guided against one another non-rotatably.

12. The apparatus according to claim 10, further comprising a spring (98) arranged between the two tension rod parts (61a, 61b) and acting in the axial direction.

13. The apparatus according to claim 6, wherein the tension rods (61) have at least one region that is resilient in the axial direction.

14. The apparatus according to claim 5, wherein the clamping elements are individually coupled at least in pairs with an associated actuation element of the actuation device.

15. The apparatus according to claim 14, wherein the actuation element is accessible from an outer side of the tool carrier (1) or the tool holder (3).

16. The apparatus according to claim 14, wherein the actuation element comprises a dimensionally stable tensioning bar (75), which is supported against the tool carrier (1) or the tool holder (3).

17. The apparatus according to claim 1, wherein the actuation device is coupled mechanically or via a pressure medium with elements of the clamping device (60).

18. The apparatus according to claim 16, wherein the clamping device (60) comprises clamping elements formed as tension rods (61); and
   wherein the tensioning bar (75) is coupled detachably in a form-fitting manner with the tension rods (61) associated therewith.

19. The apparatus according to claim 1, wherein the actuation device is configured to be actuated via pressure medium.

20. The apparatus according to claim 6, wherein the tension rods (61) are coupled with actuation pistons (94) or are formed at least partially as actuation pistons, and the actuation pistons are configured to be acted on at least in pairs by a pressure medium.

21. The apparatus according to claim 1, wherein the devices for fastening the tool holder have means by which the tool holder is configured to be connected to the tool carrier alternatively to the clamping device.

22. The apparatus according to claim 1, wherein the tool holder is formed as a workpiece holder.

23. A tool holder for use in a tool clamping device, the tool holder comprising:
- a housing (13, 14), which has a support face (15) designed for support on a tool carrier, and wherein the housing includes attached thereon:
  - at least one adjustment element (17) protruding axially beyond the support face (15) for accurately positioning the tool holder (3) with respect to a socket of a tool carrier provided at least with a receiving groove for the adjustment element, or
  - at least one receiving groove for receiving at least one adjustment element of a tool carrier protruding axially beyond the support face;
- at least two anchoring rods (16), which are designed to detachably fasten the tool holder to the tool carrier and are arranged extending at right angles to the support face (15) at a distance from one another and separately from the adjustment element (17), wherein the at least two anchoring rods (16) are configured to be engaged by a clamping device (60) that when clamped exerts an axial clamping force on the at least two anchoring rods (16).

24. The tool holder according to claim 23, wherein the anchoring rods (16) are each arranged centrally between two adjacent adjustment elements (17).

25. The tool holder according to claim 23, wherein the anchoring rods (16) are attached to the housing (13, 14) or the tool carrier (1) so as to be movable transversely to a limited extent.

26. The tool holder according to claim 25, wherein the housing (13, 14) has groove-shaped recesses, in which the anchoring rods (16) are guided displaceably.

27. The tool holder according to claim 23, wherein the anchoring rods (16) each have lateral guide faces (49), which are designed for cooperation with guide faces on a tool carrier or the tool holder.

28. The tool holder according to claim 23, wherein the anchoring rods (16) are wedge-shaped in a region protruding beyond the support face (15).

29. The tool holder according to claim 23, wherein the anchoring rods (16) define branches that delimit space between the branches in a region protruding beyond the support face (15).

30. The tool holder according to claim 23, wherein individual ones of the anchoring rods comprise a head part (42), a neck part (46) narrower than the head part, and a clamping part (47).

31. The tool holder according to claim 30, wherein the clamping part (47) has at least one wedge face (55) configured to act as part of a wedge transmission.

32. The tool holder according to claim 23, wherein the anchoring rods (16) each have a clamping part (47), which is formed with a thread for receiving a threaded bolt.

33. A tool carrier for use in a tool clamping device, the tool carrier comprising:
- at least one support face (2) for a tool holder,
- at least one receiving groove (35, 36) for at least one adjustment element of a tool holder fitted onto the at least one support face or at least one adjustment element protruding axially beyond the support face is arranged,
- a fastening device comprising:
  - at least two openings (72), which are arranged in a region of the support face (2) and start therefrom and are each designed to receive an anchoring rod of a tool holder fitted onto the at least one support face, and
  - a clamping apparatus (60) provided on the tool carrier and designed, to, during a clamping operation, act on the anchoring rods protruding into the openings (72) and to exert an axial tensile force thereonto, and
  - the clamping apparatus (60) configured to act on the at least two anchoring rods jointly.

34. The tool carrier according to claim 33, wherein the clamping apparatus (60) comprises clamping elements guided movably in the tool carrier (1) and which are displaceable between an active position, engaged with an associated anchoring rod, and a rest position, releasing the associated anchoring rod.

35. The tool carrier according to claim 34, wherein the clamping elements are formed as tension rods (61), which are guided displaceably in the tool carrier and carry an engagement part (62) cooperating in each case with an associated anchoring rod.

36. The tool carrier according to claim 35, wherein the engagement part (62) has at least one wedge face (66), which is designed to form a wedge transmission together with a wedge face of an associated anchoring rod.

37. The tool carrier according to claim 35, further comprising guide means (73) for an associated anchoring rod.

38. The tool carrier according to claim 35, wherein individual ones of the tension rods are formed in two parts.

39. The tool carrier according to claim 35, wherein the tension rods are axially resilient.

40. The tool carrier according to claim 34, wherein the clamping elements are each coupled at least in pairs with an actuation element.

41. The tool carrier according to claim 40, wherein the actuation element is accessible from an outer side of the tool carrier.

42. The tool carrier according to claim 40, wherein the actuation element has a dimensionally stable tensioning bar (75), which is supported against the tool carrier.

43. The tool carrier according to claim 42, wherein the clamping elements are formed as tension rods (61), which are guided displaceably in the tool carrier and carry an engagement part (62) cooperating in each case with an associated anchoring rod, and the tensioning bar (75) is coupled detachably in a form-fitting manner with the tension rods associated therewith.

44. The tool carrier according to claim 34, wherein the clamping elements are configured to be displaceable by actuation means which are actuated via a pressure medium.

45. The tool carrier according to claim 35, wherein the tension rods (61) are coupled with actuation pistons (94) or are formed at least partially as actuation pistons, and the actuation pistons of the clamping apparatus (60) are configured to be acted on at least in pairs by a pressure medium.

* * * * *